Feb. 19, 1924. Re. 15,770
E. E. RICHARDSON
THROTTLING VALVE
Original Filed June 6, 1916
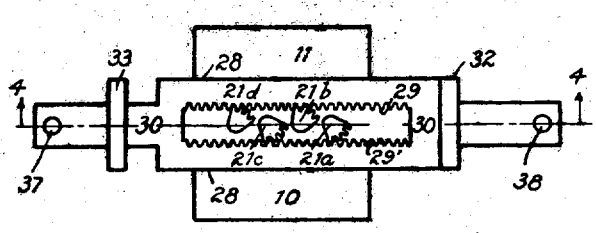
Fig-3
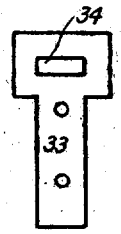
Fig-5
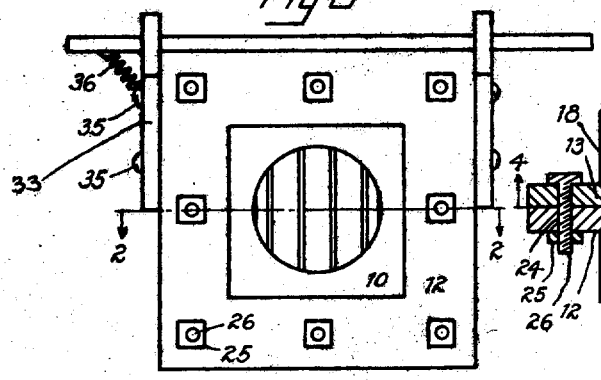
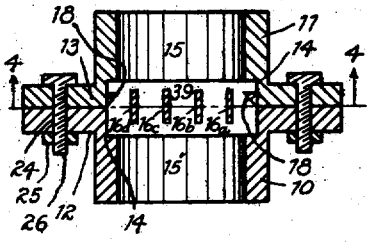
Fig-2
Fig-1
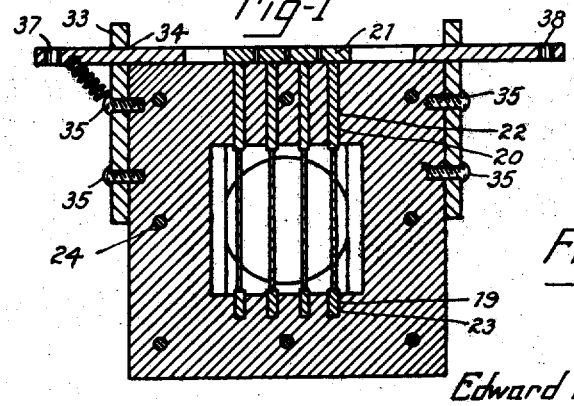
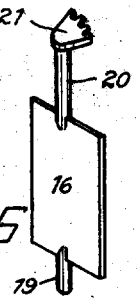
Fig 6
Fig-4
Edward Edward Richardson
INVENTOR.
BY Richey Slough + Theles
HIS ATTORNEYS Reissued Feb. 19, 1924. Re. 15,770

UNITED STATES PATENT OFFICE.

EDWARD E. RICHARDSON, OF TOLEDO, OHIO, ASSIGNOR, BY DIRECT AND MESNE ASSIGNMENTS, TO THE R. & S. VALVE COMPANY, OF ELYRIA, OHIO, A CORPORATION OF OHIO.

THROTTLING VALVE.

Original No. 1,270,327, dated June 25, 1918, Serial No. 101,959, filed June 6, 1916. Application for reissue filed January 31, 1920. Serial No. 355,365.

*To all whom it may concern:*

Be it known that I, EDWARD EDWARD RICHARDSON, a citizen of the United States, and a resident of the State of Ohio and the city of Toledo, in the county of Lucas, have invented a certain new and useful Throttling Valve, of which the following is a specification.

In the drawings which accompany this application and form a part thereof:

Fig. 1 is a front elevation of the valve.

Fig. 2 is a horizontal section of the valve along the lines 2—2 of Fig. 1.

Fig. 3 is a plan view of the valve showing the rack and pinion mechanism.

Fig. 4 is a vertical section on the line 4—4 of Fig. 2 or Fig. 3.

Fig. 5 is a front elevation of the rack support, and

Fig. 6 is a perspective of the revoluble shutter.

Similar numerals refer to similar parts throughout the several views.

My valve consists generally of a conductor in which are interposed shutters or vanes which may be allowed to remain open and permit the flow of substance through the valve, or may be closed to cut off such flow. The conductor consists of two similar casing parts 10 and 11 square exteriorly and each provided with a boss 12 or 13 on the end adjacent the other part. Interiorly the conductor is generally circular and preferably threaded to facilitate the insertion into a pipe line. At the end nearer the other part, however, the conductor parts are recessed, as at 14, to form the square pocket 39, which forms the valve chamber proper. The boss on the exterior of the casing parts is provided for the purpose of securing together the two parts and for that purpose is provided with holes 24, as shown, and in each hole is inserted a bolt 26 held in place by the nut 25. On the line of junction of the two parts and properly spaced are selected the centers of rotation of the shutters or vanes within the valve chamber. As illustrated, there are four of these shutters and accordingly four holes 22 are provided on the line of junction on the upper side of the casing and extending through, as shown, into the valve chamber 39. The holes are continued in the lower section of the casing at 23, but are not carried through to the outside. In these holes are mounted the axes of the revoluble shutters. Obviously, any desired number of shutters may be employed.

Each shutter is composed of a central and principal portion 16, flat and thin, and extending from this downward is the axis 19 which enters the hole 23, and extending upward from the body is the axis 20, which enters the hole 22 and is of proper length to extend in the hole 22 to slightly above the top of the casing boss 12—13 and there carries the segmental pinion 21. These axes are inserted into either part of the casing, and the two parts of the casing then clamped together effectually securing the axes in place.

Provided on the casing part 11 inside the valve chamber 39 are two projections 18 for a purpose now to be described. These projections extend the full length of the valve chamber 39 and project inwardly toward each other in angular form. When the vanes $16^a$ and $16^c$ are rotated clockwise, as shown in Fig. 2, and the vanes $16^b$ and $16^d$ are rotated counter-clockwise, the outer edges of $16^a$ and $16^d$ will contact with the angular surfaces of the projections 18, the inner edges of these vanes contacting with the outer edges respectively of the vanes $16^b$ and $16^c$, and the inner edges of the latter two vanes will contact each with the other. The opening will thus be closed.

To thus operate the vanes I utilize the segmental pinions mounted on the upper ends of the axes 20. I provide on the sides of the bosses 12 and 13 two uprights 33, each secured to the bosses by screws 35, and each provided near the upper end and immediately above the top of the bosses, with a slot 34. In these slots slides a flat rack member 27. This rack member is widened at the center portion at the shoulders 32, and this center portion then consists of two end pieces 30 connected by two side pieces 28, which latter are provided on their inner edges with teeth 29 and 29′. These teeth mesh with the teeth of the segmental pinions 21, each rack meshing with alternate pinions, and thus motion of the rack in one direction produces rotation of each alternate pinion in one direction, and of the remaining pinions in the opposite direction. The movement of the rack member is limited by the abutting of the shoulders 32 against the supports 33. The member is provided at the ends with holes 38 and 37 and these holes may be used to connect the rack member with the control therefor. One end of a spring 36 is connected to the rack member by a stud and the other end of the spring is secured to one of the screws 35.

It will be clear from the above that the valve operates as follows: Starting with the position shown in the illustrations, the rack is moved toward the left in Fig. 1. During this motion, the rack 29′ engages with the pinions $21^a$ and $21^c$ and rotates them and the vanes $16^a$ and $16^c$ in a clockwise direction. At the same time the rack 29 engages the pinions $21^b$ and $21^d$ and rotates them and the vanes $16^b$ and $16^d$ in a counter-clockwise direction, thus closing the valve as explained above. Reverse motion of the rack then opens the valve.

It will be apparent from the above that I have provided a valve readily inserted into any pipe line, that the valve acts with very slight motion of the controlling member, and that the action, therefore, may be made very rapid.

It is apparent that modifications may be made in the valve, principally perhaps in the number of vanes, the outlines of the casing parts, and the means provided for securing the valve in the conduit. All these, in so far as they are within the scope of the appended claims, I consider as within the scope and part of my invention.

I claim:

1. A valve comprising a casing, a plurality of shutter members therein, one or more other shutter members therein, said members being located in approximately a straight line, and the members of the two groups occurring alternately, and means for operating the members of the one group in one direction and the members of the other group in another direction.

2. The structure as in claim 1, the operation of the two groups being simultaneous.

3. The structure as in claim 1, one of said shutter members being rotatable.

4. The structure as in claim 1, all of said shutter members being rotatable.

5. The structure as in claim 1, said means being a single reciprocating member.

6. A valve comprising a casing, a plurality of shutter members therein, one or more other shutter members therein, the members of the two groups occurring alternately, and means for operating the members of one group in one direction and the members of the other group in another direction, said means including a body attached to each member and a reciprocating member acting directly on each body.

7. The structure as in claim 6, said shutter members being located in approximately a straight line.

8. The structure as in claim 6, said members being rotatable.

9. A valve comprising a casing, a plurality of shutter members therein, one or more other shutter members therein, the members of the two groups occurring alternately, a reciprocating bar slotted longitudinally, a body on each of said members, the bodies on the members of the one group engaging with one side of the said slot and the bodies on the members of the other group engaging with the other side of the said slot, whereby said members may be pivoted in a straight line and yet the members of the two groups be rotated in alternate directions.

10. A valve comprising a casing, a plurality of shutter members therein, one or more other shutter members therein, the members of the two groups occurring alternately, the shutter members being in approximately a straight line, a reciprocating bar slotted longitudinally, a body on each of said members, the bodies on the members of the one group engaging with one side of said slot and the bodies on the members of the other group engaging with the other side of said slot.

11. A valve comprising a casing, a plurality of vanes therein, another plurality of vanes therein, the vanes in the two groups occurring alternately, a segmental pinion on each vane, a reciprocating rod slotted longitudinally, teeth on the edges of said slot, the pinions on the vanes of the one group engaging the teeth on the one side of the slot and the pinions on the vanes of the other group engaging the teeth on the other side of said slot.

12. A valve comprising a casing, a plurality of vanes therein, a second plurality of vanes therein, the vanes of the two groups occurring alternately, all of said vanes being pivoted in a straight line, a segmental pinion on the end of each vane, a reciprocating rod slotted longitudinally, teeth on the edges of the slot, the pinions on the one group of vanes engaging the teeth on the one edge of the slot and the pinions on the other group engaging the teeth on the other side of the slot, whereby alternate vanes are simultaneously rotated in alternate directions to engage each other with a wedging action.

13. A valve comprising a casing, a plurality of shutter members therein, one or more other shutter members therein, the members of the two groups occurring alternately, and means for operating the members of the one group in the one direction and the members of the other group in another direction, said means including a body attached to each member and a single actuating member attached directly to all of said bodies.

14. A valve comprising a casing, a plurality of shutter members therein, one or more other shutter members therein, the members of the two groups occurring alternately, said members being in approximately a straight line, and means for operating the members of the one group in the one direction and the members of the other group in the other direction, said operation being by a single member.

15. The structure as in claim 10, said members being operated simultaneously.

16. A valve comprising a casing, shutter members pivoted therein, one of said shutter members in closed position being adapted to engage with another of the shutters on their inner edges, and means for operating said members simultaneously in opposite directions, said means including a body attached to each member and a reciprocating member acting directly on each body.

17. A valve comprising a casing, vanes pivoted therein, a pinion member attached to each vane, and a rack member meshing with one pinion member on one side and with the other pinion member on the other side, whereby movement of said rack member operates the vanes simultaneously in opposite directions.

18. A valve comprising a casing, vanes pivoted therein, seats extending inwardly from the walls of said casing adapted to engage the edges of two of said vanes when moved towards closed position, and means for moving said vanes simultaneously in opposite directions.

19. A valve comprising a casing having a rectangular chamber, shutters pivoted therein, the ends of said shutters engaging two of the walls of said chamber, seats projecting from two other of said walls and adapted to engage edges of two of said shutters when moved towards closed position, and means for moving said vanes simultaneously in opposite directions.

In witness whereof, I have hereunto signed my name this 12th day of December, 1919.

E. E. RICHARDSON.